(12) United States Patent
Ahmed et al.

(10) Patent No.: US 8,349,035 B2
(45) Date of Patent: Jan. 8, 2013

(54) AUTOTHERMAL AND PARTIAL OXIDATION REFORMER-BASED FUEL PROCESSOR, METHOD FOR IMPROVING CATALYST FUNCTION IN AUTOTHERMAL AND PARTIAL OXIDATION REFORMER-BASED PROCESSORS

(75) Inventors: Shabbir Ahmed, Naperville, IL (US); Dionissios D. Papadias, Chicago, IL (US); Sheldon H. D. Lee, Willowbrook, IL (US); Rajesh K. Ahluwalia, Burr Ridge, IL (US)

(73) Assignee: UChicago Argonne, LLC, Chicago, IL (US)

( * ) Notice: Subject to any disclaimer, the term of this patent is extended or adjusted under 35 U.S.C. 154(b) by 499 days.

(21) Appl. No.: 12/582,559

(22) Filed: Oct. 20, 2009

(65) Prior Publication Data
US 2010/0095590 A1 Apr. 22, 2010

Related U.S. Application Data

(60) Provisional application No. 61/106,888, filed on Oct. 20, 2008.

(51) Int. Cl.
*B01J 7/00* (2006.01)
*B01J 8/00* (2006.01)
*C01B 6/24* (2006.01)
*C01B 3/02* (2006.01)

(52) U.S. Cl. ............ 48/61; 422/129; 422/625; 422/629; 423/644; 423/648.1

(58) Field of Classification Search ............ 48/61; 425/625–629; 423/644–658.2
See application file for complete search history.

(56) References Cited

U.S. PATENT DOCUMENTS
6,521,204 B1 * 2/2003 Borup et al. .................. 423/652

* cited by examiner

*Primary Examiner* — Matthew Merkling
(74) *Attorney, Agent, or Firm* — Cherskov Flaynik & Gurda, LLC

(57) ABSTRACT

The invention provides a fuel processor comprising a linear flow structure having an upstream portion and a downstream portion; a first catalyst supported at the upstream portion; and a second catalyst supported at the downstream portion, wherein the first catalyst is in fluid communication with the second catalyst. Also provided is a method for reforming fuel, the method comprising contacting the fuel to an oxidation catalyst so as to partially oxidize the fuel and generate heat; warming incoming fuel with the heat while simultaneously warming a reforming catalyst with the heat; and reacting the partially oxidized fuel with steam using the reforming catalyst.

9 Claims, 13 Drawing Sheets

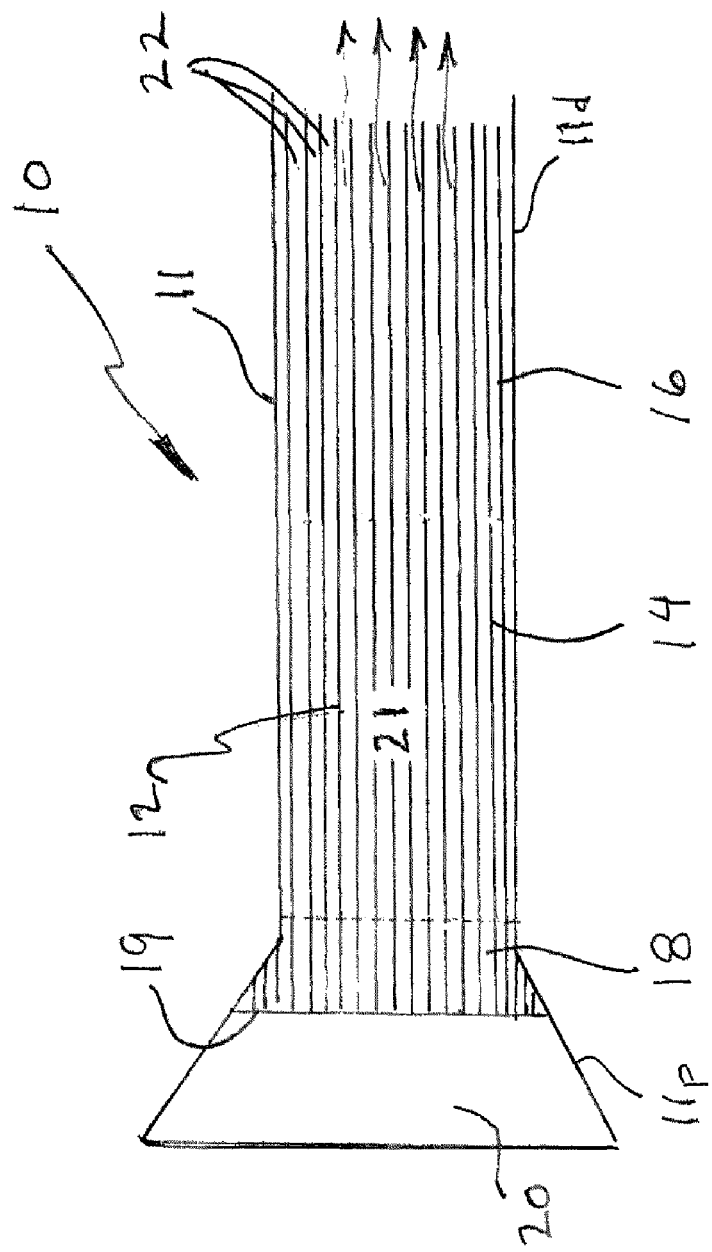

AUTOTHERMAL AND PARTIAL OXIDATION REFORMER-BASED FUEL PROCESSOR, METHOD FOR IMPROVING CATALYST FUNCTION IN AUTOTHERMAL AND PARTIAL OXIDATION REFORMER-BASED PROCESSORS

PRIORITY

This Utility Patent Application claims the benefits of U.S. Provisional Patent Application No. 61/106,888, filed on Oct. 20, 2008.

CONTRACTUAL ORIGIN OF THE INVENTION

The U.S. Government has rights in this invention pursuant to Contract No. DE-AC02-06CH11357 between the U.S. Department of Energy and the University of Chicago representing Argonne National Laboratory.

BACKGROUND OF THE INVENTION

1. Field of the Invention

The present invention relates to partial oxidation or autothermal reforming of fuel, and more specifically, the invention relates to segmented catalyst systems for use in reforming of fuel for use in fuel cells.

2. Background of the Invention

Partial oxidation and autothermal reformers convert hydrocarbon and oxygenated fuels into hydrogen and carbon oxides which can be used in fuel cell applications; particularly fuel cell applications constrained by weight and volume, or which require frequent starts and stops, and have to respond to changes in hydrogen demand. Partial oxidation and autothermal reformers are able to meet these requirements because these reactors operate with a feed that consists of fuel and air in partial oxidation systems and fuel, air and steam in autothermal reformers. Oxygen in the reactant mix allows the fuel oxidation/combustion reaction, which is needed to enable the endothermic steam reforming reaction to occur.

The reforming reactors typically use a noble metal catalyst that supports both the oxidation and reforming reactions, with the oxidation zone followed by the reforming zone. The Reforming zone is where oxygen concentration is extremely low.

Generally, a partial oxidation/combustion reaction first occurs as depicted in Equation 1:

$$C_nH_m + O_2 \rightarrow CO + CO_2 + H_2O. \quad \text{Equation 1}$$

The reaction in Equation 1 is exothermic and provides heat necessary to drive the reforming portion of any autothermal reformer system, the reforming portion depicted in Equation 2:

$$C_nH_m + H_2O \rightarrow CO + CO_2 + H_2 \quad \text{Equation 2}$$

Generally, the reforming portion (i.e., Equation 2) of the process occurs at relatively low oxygen concentrations.

Temperature profiles consist of a sharp peak that can reach or exceed 1000° C., at which temperature the catalyst activity diminishes over time. In order to reduce the maximum temperature and thereby extend the life of the catalyst, reactor designs vary the air-to-fuel, allow multiple injections of air, and, in the case of autothermal reformers, steam-to-fuel ratios. While reducing the air in the mixture feeds (i.e., making the fuel mix richer) will minimize peak temperatures, it also leads to a lower average temperature and therefore to lower hydrogen yields.

Other attempts to lower system temperature include siphoning heat from exothermic portions of the reaction, warming air with that heat, then injecting that heated air at multiple injection points. However, this has proved counterproductive, inasmuch as the air reacts with any hydrogen produced instead of being utilized to facilitate oxidation of the carbon in the unconverted hydrocarbon.

A need exists in the art for a system for reforming fuel, and a method for reforming fuel that preserves the life of the catalysts used in such scenarios. The method and system should provide for near complete conversion of fuel, while also ensuring that the catalysts last for at least 5000 start-stop cycles, assuming 10 hours per cycle. The method and system should also be initiated with an energy input (in BTUs) which is no more than 1 to 3 percent, and preferably less than one percent of the total energy produced by the system/method during each cycle.

SUMMARY OF INVENTION

An object of the invention is to provide a method for improving catalyst function in autothermal and partial oxidation reformer-based processors that overcomes many of the disadvantages of the prior art.

Another object of the present invention is to provide a system for vastly increasing the catalyst life in autothermal and partial oxidation reformer-based processors. A feature of the invention is the physical separation of different catalysts in the system. An advantage of the invention is that the different catalysts are each heated to their optimum operating temperature to concomitantly facilitate chemical conversions.

Yet another object of the present invention is to provide a partial oxidation or an autothermal reformer based system which comprises three temperature zones. A feature of the invention is a porous catalyst support structure that extends throughout the zones, such that catalysts used in the system all contact the structure so as to be supported by the structure. An advantage of the invention is that the structure provides a conduit for both heat and fluids to traverse through the zones, thereby establishing fluid communication between the temperature zones. This structure provides a means for dissipating thermal energy generated in oxygen-rich upstream conversions so as to protect more heat sensitive, downstream noble-metal catalysts.

Briefly, the invention provides a fuel processor comprising a linear flow structure having an upstream portion and a downstream portion; a first catalyst supported at the upstream portion; and a second catalyst supported at the downstream portion, wherein the first catalyst is in fluid communication with the second catalyst.

Also provided is a method for reforming fuel, the method comprising: contacting the fuel to an oxidation catalyst so as to partially oxidize the fuel and generate heat; warming incoming fuel with the heat while simultaneously warming a reforming catalyst with the heat; and reacting the partially oxidized fuel with steam in the presence of the reforming catalyst.

BRIEF DESCRIPTION OF DRAWING

The invention together with the above and other objects and advantages will be best understood from the following detailed description of the preferred embodiment of the invention shown in the accompanying drawings, wherein:

FIGS. 1A-B are schematic drawings of a catalyst system encapsulated by a housing, in accordance with features of the present invention;

DETAILED DESCRIPTION OF THE INVENTION

Figure 1B:
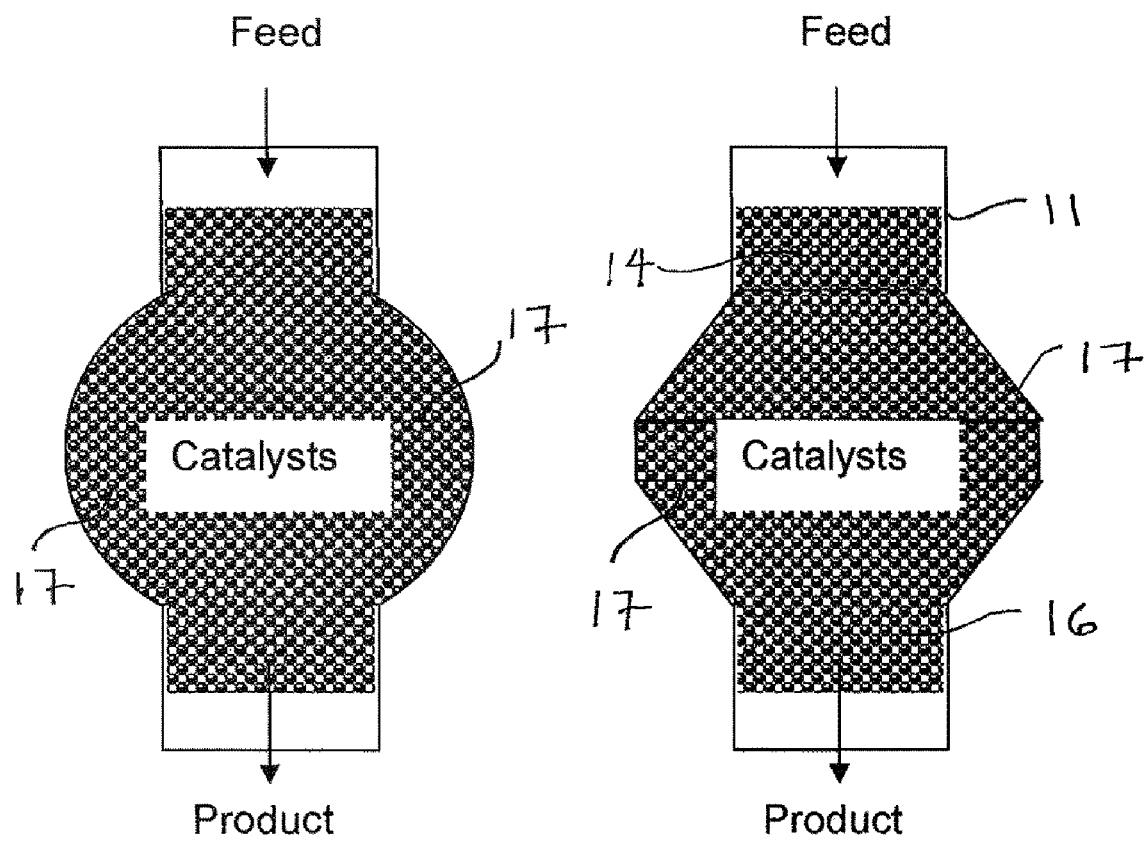

The foregoing summary, as well as the following detailed description of certain embodiments of the present invention, will be better understood when read in conjunction with the appended drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The invention is a process and new reactor design that overcomes the problem of catalyst durability resulting from the high temperatures encountered in autothermal and partial oxidation reactors, yet has excellent durability and is of simple design. The system allows the oxidation reactions (i.e. "light off") to begin as low as about 480 C in the presence of oxygen.

An embodiment of the new reactor design embodies a two step system, with each step associated with a catalyst. One of the catalysts (the more upstream of the two catalysts) is a high (i.e. above 900 C) temperature catalyst (such as hexa-aluminate) while the other catalyst is a relatively lower temperature (i.e., below 900 C) catalyst (such as a noble metal catalyst).

Another embodiment of the invention embodies three conductive catalyst support structures or units. The first structure provides a means for distributing the feed radially and to heat incoming reactant stream. This means includes, but is not limited to, a metallic foam which facilitates fluid transfer in all directions of the foam. This foam, positioned before (or upstream of) the first active catalyst, disperses (by conduction) the heat of reaction of the exothermic process on the first active catalyst, toward the incoming feed stream (countercurrent to the direction of flow and preheating the incoming feed). This flattens out the axial temperature profile of the reactor, thereby reducing peak temperatures experienced by catalysts which facilitate endothermic steam reforming reactions. This transfer of heat upstream provides a means for limiting the peak temperature experienced by the temperature-sensitive downstream catalysts.

The second unit is a support (which could be contiguous with the metallic foam structure) loaded with an oxidation catalyst (e.g., with hexa-aluminate, $(ABAl_{11}O_{19})$) to promote the rapid oxidation/combustion reaction. These oxidation reactions generate sufficient temperatures such that the steam reforming reaction can occur on the hexa-aluminate catalysts and in the gas phase homogeneously. The third unit is loaded with a reformer catalyst such as noble metal catalyst.

Generally, all that is required in the positioning of these catalysts is that fluid communication exists between the catalysts. As such, a single catalyst support substrate defining flow through conduits from its upstream end to its downstream end is suitable, wherein zones of the support are devoted to supporting only specific catalyst types. This feature provides a means for rapid dissipation of heat from exothermic catalysts toward the cooler, feed inlet, and also simultaneously toward the reforming, endothermic reaction facilitating catalyst downstream. As such, this feature provides a means for anchoring the process's peak temperature within the upstream, exothermic reaction facilitating catalyst, where the reactant mix is richer in oxygen.

Conversely, a plurality of support substrates, each supporting a specific catalyst is suitable, wherein the support substrates are positioned end-to-end to facilitate fluid flow through from an upstream end (or fuel ingress) end of the system to the downstream or egress end of the system.

Compared to the noble metal catalyst, the oxidation/combustion catalysts have lower activity, i.e., slower reaction rate at a given temperature, and can tolerate higher temperatures. For example, as an embodiment of an oxidation catalyst, hexa-aluminate can be supported on a porous support with high thermal conductivity, such as a metallic foam, to enable rapid dissipation of heat toward the cooler feed inlet and the reforming catalyst downstream.

Benefits of this design are that the peak temperature is sequestered or otherwise contained within the support substrate supporting the oxidation catalyst (e.g. hexa-aluminate), which can tolerate the high temperature, while reducing the peak temperature in the noble metal. During start-up, the up stream catalyst needs to be heated to a higher temperature (compared to the noble metal catalyst) before "ignition" can take place. This can be overcome by heating the hexa-aluminate zone to the higher ignition temperature (higher relative to the light off temperature needed by the downstream reforming catalyst) with a hotter feed stream of gases, spark plugs, or with electric heating elements that can be turned off after ignition.

Foundation Substrate Detail

FIG. 1 depicts an exemplary segmented catalyst system, designated as numeral 10. A salient feature of the system is a catalyst support substrate 12. This support 12 comprises a heat resistant material (resistant to at least 1400° C.) which has an extremely high surface area. The substrate can be either one piece, as depicted, or a plurality of pieces. Exemplary surface areas range from about 1 m$^2$/g to 1200 m$^2$/g, preferably from about 1 m$^2$/g to 120 m$^2$/g.

Suitable support substrate material includes, but is not limited to Cordierite, Alumina, Mullite, Lithium aluminum silicate, and Aluminum titanate. These materials have maximum temperatures ranging from 1300° C. for the lithium material to 1800° C. for the alumina. Commercially available cordierite monolith is available from Corning. Metallic foam, such as iron chromium aluminum alloy (FeCrAlY), is available from Porvair (Norfolk, UK).

Whatever catalyst support substrate is utilized, it is preferable that the support enable fluid transfer from one end to another in a fashion to maximize catalytic interaction between the fluid and the catalysts residing on the support. One means for enabling fluid transfer is where the support defines conduits, channels or other passageways 22 throughout its bulk.

As depicted in FIG. 1A, a housing, 11, reminiscent of a sleeve, encapsulates peripheral regions of the support 12 and longitudinally (i.e., axially) extends along substantially the entire length of the configuration so as to encircle peripheral regions of all of the catalysts utilized. In one embodiment, an upstream (i.e., proximal) end 11$p$ of the housing is wider, in flow through diameter, than a downstream (i.e. distal) end 11$d$ of the housing 11.

The housing 11 also may resemble a sleeve having a first feed inlet end, a second, product exit end, and a midsection which has a diameter larger than the first and/or second end. One embodiment of this housing is depicted in FIG. 1B, and comprises a sphere (having a diameter d) positioned between two co-axial cylinders (each having an inner diameter<d). All of the volume defined by the cylinders and most of the volume defined by the sphere provides a linear flow passage or conduit in which are situated the catalysts. However, and as FIG. 1B depicts, this embodiment provides laterally spaced regions of the catalysts, positioned within the midsection of the housing, which remain outside of direct fluid flow.

Oxidation Region Detail

FIG. 1A depicts arrows which show the direction of fluid flow through the system. The upstream portion 14 of the system supports a catalyst to facilitate the reactions depicted in Equation 1, supra. As such, catalysts which can withstand temperatures up to their sintering point (e.g., 1200° C. for hexa-aluminate) are suitable. Suitable catalysts for this oxidation portion of the system are those which have enhanced oxygenation activities at temperatures above 900 C, preferably between about 900 C and 1200 C, and most preferably between about 900 C and 1000 C. A salient feature of the device is to facilitate conversion of hydrocarbon or oxygenated hydrocarbon fractions to hydrogen and carbon oxide gases at as low a temperature as possible. This will obviate the need for large quantities of more expensive finisher catalysts, such as those containing noble metals.

Exemplary catalysts for the oxidation portion of the system include, but are not limited to, hexyluminates, spinels, perovskites, and garnets. Specific suitable hexa aluminates include, but are not limited to, $LaAl_{11}O_{19}$, $LaMnAl_{11}O_{12}$. Suitable spinels include, but are not limited to, $MgAl_2O_4$, $MgMn_{0.25}Al_{1.75}O_4$. Suitable garnets include, but are not limited to, $Y_3Al_5O_{12}$ and $Y_3Mn_{0.1}Al_{4.9}O_{12}6Al_2O_3$. Suitable pervoskites include, but are not limited to, $LaMnO_3$, $LaCoO_3$. Generally, these oxidation/combustion catalysts have lower activity and tolerate higher temperatures. Therefore, they are utilized in the hottest, upstream portions of the system.

Reformer Region Detail

The downstream portion 16 of the system supports a finisher catalyst to facilitate the reactions depicted in Equation 2, supra. Generally, such reforming catalysts provide optimal performances at temperatures not exceeding 850° C. Also, this portion of the system must operate at low oxygen concentrations to avoid rapid oxidation reactions that will produce hotspots on the catalyst surface leading to deactivation. Typical mole fractions for oxygen in the reaction fluid should range from between about 0 and 5 percent, preferably from about 0 to 1 percent, and most preferably from about 0 to 0.5 percent.

Preferably, support foundation substrates for the catalysts and catalyst supports in this region of the system are of the relatively lower thermal conductivity variety (such as ceramic foam) so as to conserve any heat directed to it from the upstream oxidation process. Exemplary catalysts for this portion of the system include, but are not limited to catalysts containing such noble metals as Rh, Pt, Pd, or metals/metal oxides Ni, Co, NiO, and combinations thereof. Supports for these noble metals include La—$Al_2O_3$, hexa-aluminate structures, $TiO_2$, $La_2O_3$, $CeO_2$, Gd—$CeO_2$, $ZrO_2$, MgO, $SiO_2$ $\gamma$-$Al_2O_3$, $Y_2O_3$ and combinations thereof. These noble metal supports in turn, rest upon the foundation substrates (i.e. the catalyst support substrates) discussed supra.

Rhodium-based catalysts are particularly suitable inasmuch as rhodium has very high activity and selectivity for $H_2$ and CO. Rhodium also displays a lower tendency to coke. When rhodium is loaded on La—$Al_2O_3$ supports (which has a surface area greater than 90 m$^2$/g) the rhodium maintains a high dispersion at 900° C. Preferable reformation temperatures are 750-850° C.

Preheater Portion Detail

Attention is directed now to the leading edge 19 of the catalyst support 12. The support defines a larger diameter at this region of the system, compared to further downstream. This larger diameter provides a means for ensuring that any heat generated by the reactions further downstream, is not immediately blown further downstream by the velocity of the reaction mixture. Rather, the leading edge 19 of the catalyst support 12 remains uncoated so as to allow heat to travel in a countercurrent fashion so as to preheat incoming fuel.

Figure 5:
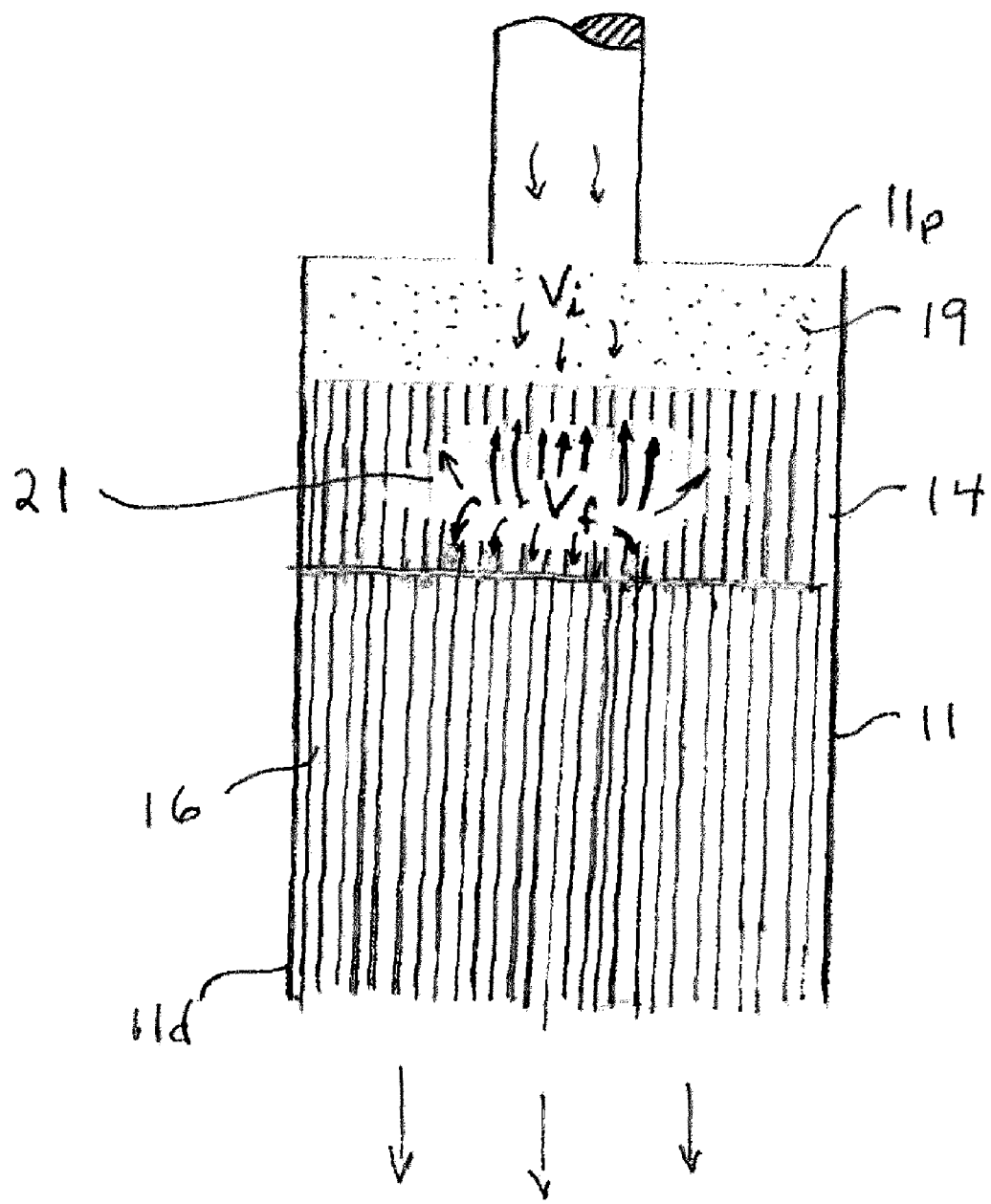
FIG. 5 is a schematic diagram showing the segmented catalyst in operation, in accordance with features of the present invention.

FIG. 5 provides a schematic depiction of a feature of the invention whereby flame velocity ($V_f$) is generally greater than incoming fuel velocity ($V_i$) so as to ensure preheating of the fuel prior to its ignition in the bulk of the oxidation catalyst support foundation. FIG. 5 depicts the preheating zone 19 as comprising a metallic foam, while the oxidation 14 and reforming zones 16 are more linear-flow monolith (e.g. cordierite) in structure. FIG. 5 also depicts two different foundation substrates, axially aligned so as to facilitate fluid flow from the substrate supporting exothermic region 14 to the substrate supporting the reformer region 16. However, and as noted above, the exothermic region and the reformer region can be supported on one contiguous foundation substrate 12 as depicted in FIG. 1.

Generally, and as noted supra, the front region of the system is defined by a metallic foam so as to assure radial dispersion of incoming fuel to the entire diameter of the catalytic support structure, and also to assure blow back of heat, which is generated from the mid portion 21 of the exothermic reaction zone of the system, toward the fuel ingress point.

The high heat generated in the exothermic reactions (which are relegated to the upstream portion 14 of the system) also dissipates toward the downstream portion 16 of the system, thereby providing heat to facilitate the endothermic process occurring there. Inasmuch as a certain amount of heat dissipation will occur from the exothermic reaction region of the system to all portions of the system, the heat radiating toward the downstream portion will be considerably less than the heat found in the exothermic region. This dissipation then, provides a means for isolating the more temperature intolerant reforming catalysts from the high temperature regions of the system.

In summary of this point, the flow-through character of the catalytic support provides a means to simultaneously preheat incoming fuel, and provide heat to the reforming reaction.

Figure 2:
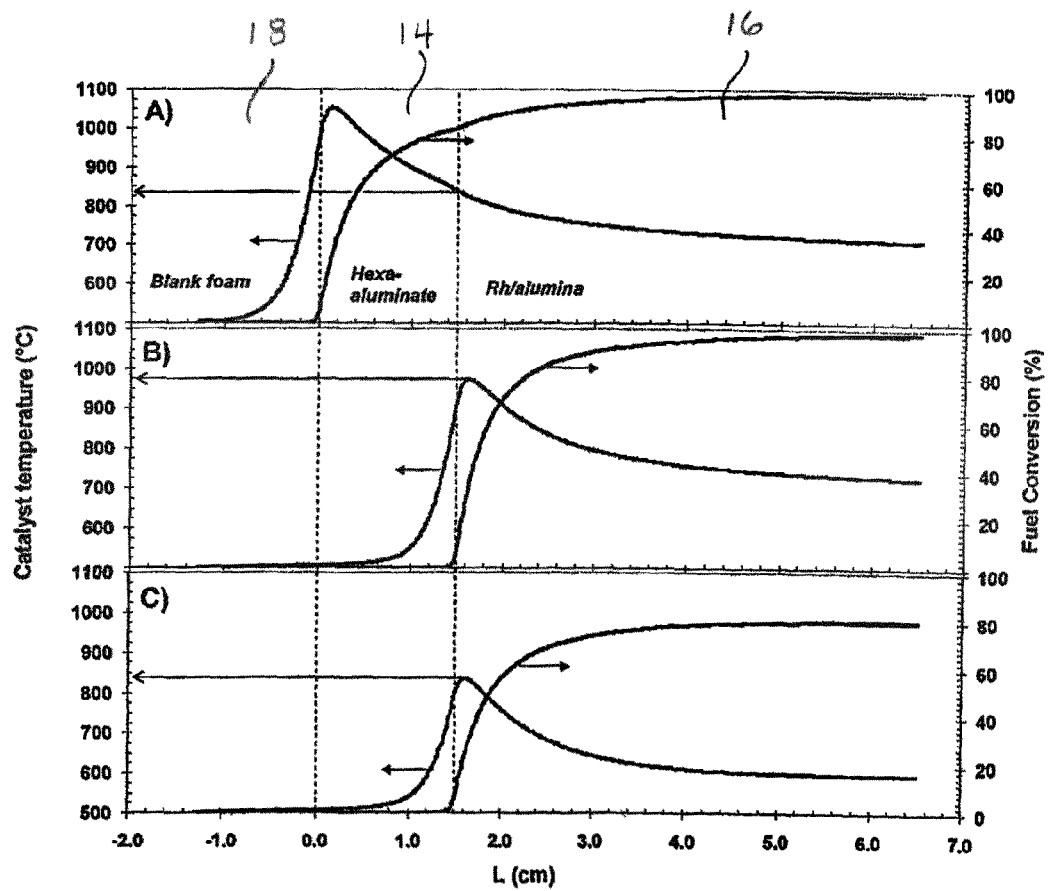
FIG. 2 is graph showing temperature profiles for catalysts in the system for three different ignition scenarios, for a three region reactor in accordance with features of the present invention.

FIG. 2 depicts the effect of fuel conversion and catalyst temperature for three different cases. In case A, ignition of fuel and air occurs on the hexa-aluminate (upstream portion 14). The temperature increases rapidly due to the oxidation reaction. When oxygen has been consumed, the temperature progressively cools due to the endothermic reactions. After the hexa-aluminate, the temperature has dropped to 840° C. and approximately 80 percent of the fuel has been converted.

Case B shows the scenario where ignition occurs on the Rh-catalyst section (i.e., the downstream portion 16). The exit conversion after the Rh-catalyst is similar between case A and B, but the Rh-catalyst in case B peaks at 970° C., which will damage the reforming catalyst.

In Case C, ignition occurs again on the Rh-catalyst section but the air-to-fuel ratio is decreased to 0.36 from 0.53 to reduce the peak temperature. The peak temperature of 840° C. seen by the Rh catalyst is the same as in Case A, but because of the lower average bed temperature in Case C, the conversion of the fuel is much lower (80 percent compared to 98.6 percent in Case A).

FIG. 2 also shows the three portions of the catalyst support, as discussed supra. Specifically, the uncoated portion 18 of the catalyst is designated as "blank foam" in the figure. The oxidation or upstream portion 14 of the catalyst support is designated as "hexa-aluminate." The reforming or downstream portion 16 of the catalyst support is designated as "Rh/aluminate." The blank foam region serves as a means to distribute the fuel feed radially and to heat incoming reactant stream. The hexa-aluminate region, positioned intermediate the blank foam and the reforming region, promotes rapid oxidation/combustion reactions and generates sufficient temperatures to facilitate endothermic steam reformation in the Rh/aluminate portion of the system.

In an embodiment of the invention, palladium catalyst is applied near the leading edge 19 of the catalyst support. Such placement of an oxidation catalyst serves to initialize combustion anchor the flame front at the proximal end of the system. This, further insulates the more sensitive reforming catalyst from heat spikes.

The three region system confers the following benefits:

1. Peak temperatures generated in the system are anchored within the hexa-aluminate catalyst where the reactant mix is richer in oxygen.

2. By flattening out the axial temperature profile in the reactor (including the maximum temperature in the noble metal), it offers greater flexibility in the choice of operating parameters, e.g., a higher air-to-fuel ratio.

3. The high temperatures in the hexa-aluminate unit support the reforming reaction both in the homogeneous (gas) phase and on the hexa-aluminate catalyst surface.

4. The metal foam support 12 dissipates the thermal energy to the inlet zone, raising the temperature to initiate the oxidation reactions of the much cooler reactant feed.

5. The metal foam support dissipates the thermal energy to the noble metal catalyst to support the endothermic steam reforming reaction.

6. Uncoated foam is placed before (i.e., upstream of) the active catalyst to disperse the heat of reaction and preheat the inlet gas, simultaneously.

7. The temperature profile within the autothermal reformer is considerably more damped, thereby reducing the thermal stress in the catalyst.

8. The desired conversion of the fuel to the reformate gas is achieved within a smaller catalyst volume.

Figure 3:
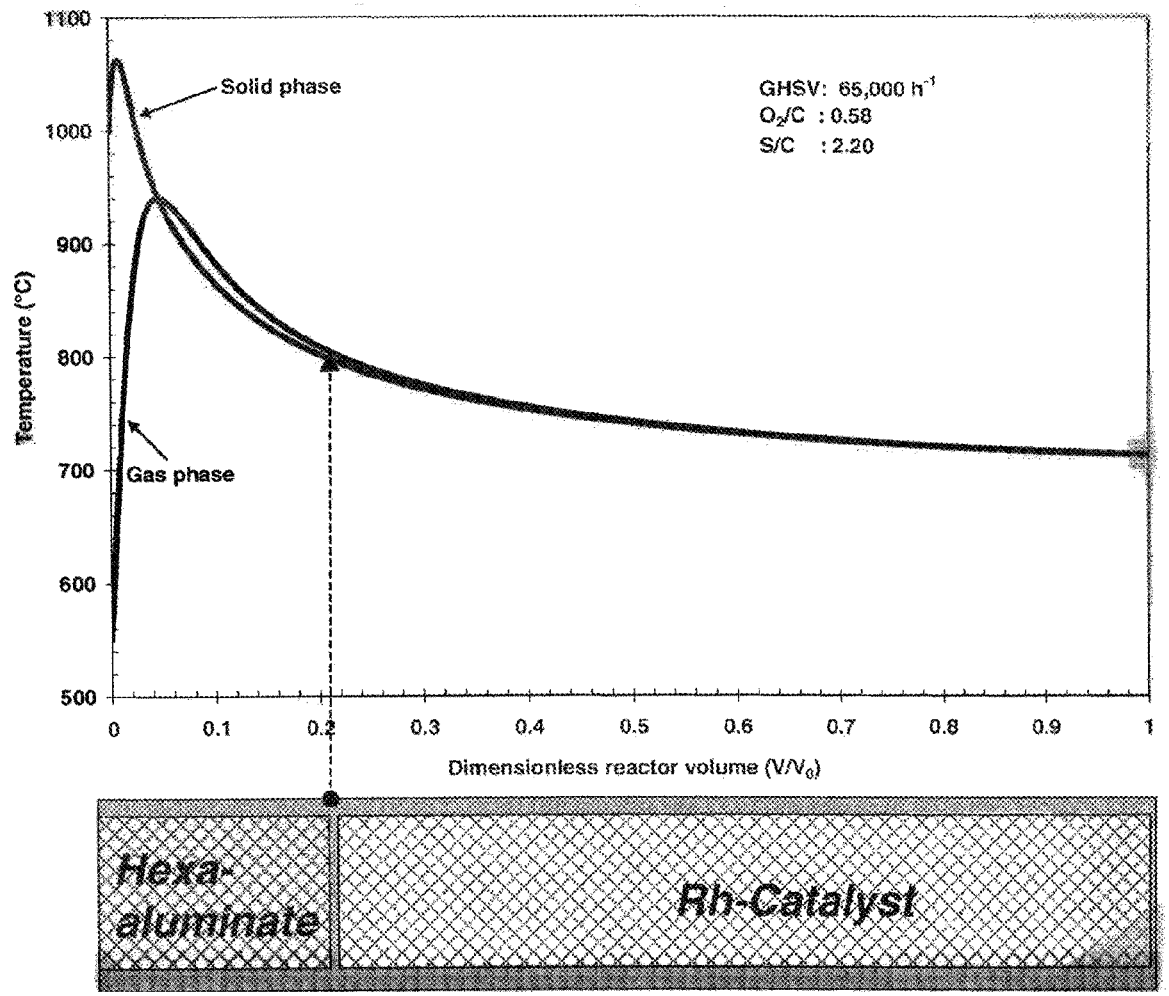
FIG. 3 is a graph showing temperature profiles for catalysts in a two region reactor, in accordance with features of the present invention.

FIG. 3 depicts a two bed autothermal reactor. As depicted in FIGS. 2 and 3, the volume of oxidation catalyst compared to noble metal catalyst is considerably less. For example, FIG. 2 shows the oxidation-to-reformer catalyst volume ratio of 1.5:6. FIG. 3 shows that the high temperatures (as high as 1075° C.) in the hexa-aluminate unit support the reforming reaction both in the homogeneous (gas) phase and on the hexa-aluminate catalyst surface.

Figure 4:
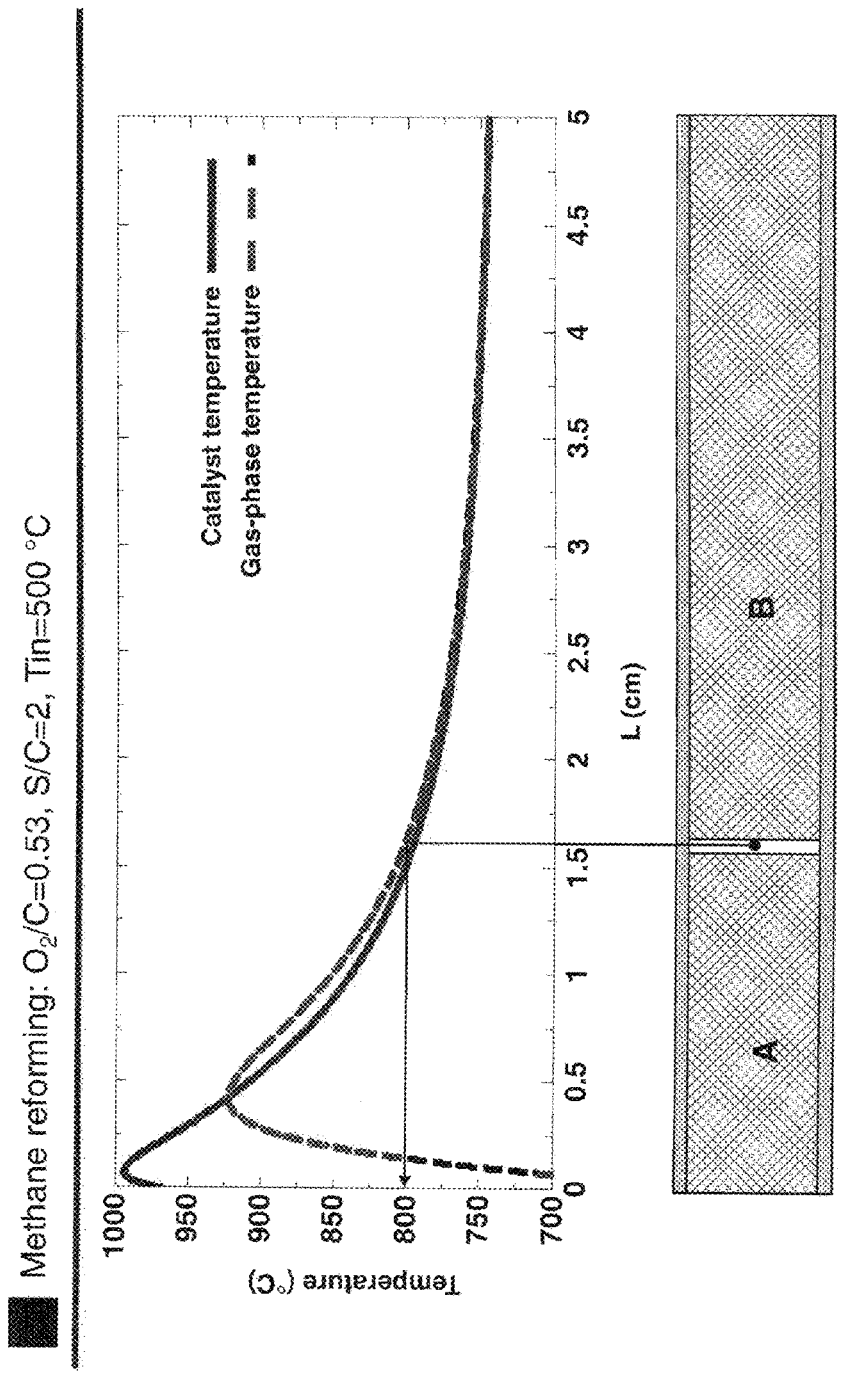
FIG. 4 is a graph showing temperature profiles at an oxygen/carbon ratio of 0.53 and a steam to carbon ratio of 2.

FIG. 4 shows a graph of oxidation/reforming temperatures related to methane fuel, with an even lower oxygen/carbon ratio of 0.53 than the 0.58 ratio of FIG. 3.

Operation Detail

The goal of the invented authothermal reformer (ATR) system is to optimize hydrogen gas production at the lowest temperatures possible. The following example features a dual bed design comprising a hexa-aluminate upstream catalyst and an RH catalyst for the downstream, finishing catalyst. The example is provided for illustrative purposes only, and is not to be construed as relegating the invention to those particular catalysts.

Hexa-aluminate catalysts tolerate high temperatures but are less active and need higher feed temperatures to ignite and sustain oxidation reactions. The ignition temperature, that is at what inlet feed temperature oxygen is consumed within the hexa-aluminate catalyst, was investigated and correlated as function of flow rate, $O_2/C$ and S/C ratios. A higher inlet temperature is needed to initiate oxidation reactions in the hexa-aluminate catalyst by a) increasing the flow rate of the feedstream through the system, b) decreasing the oxygen to carbon (O2/C) ratio or c) increasing the steam to carbon (S/C) ratio.

A piece of uncoated foam, element 18 in FIG. 1 preceded the catalyst and served to provide a uniform flow-rate to the catalyst section. A heating coil positioned proximal to (i.e., upstream from) the uncoated foam provided additional heat to the inlet reactants, since the hexa-aluminate catalyst needs higher inlet temperatures than the Rh-catalyst to sustain oxidation reactions.

The ATR catalyst was segmented into 3 sections; the first section was a hexa-aluminate catalyst (SrMnAlO) followed by the Rh-catalyst segments (Rh on La-stabilized alumina) segments. All catalysts were supported on metal foams, FeCrAllY (40 ppi). There were two gas-sampling ports to analyze the reformate composition, at the exit of the reactor and between the hexa-aluminate and the first Rh-segment.

Overall, it was found that at low inlet temperatures, the peak temperature and oxygen consumption occurred at the front section of the Rh-catalyst. As the inlet temperature increases, the oxygen is consumed on the hexa-aluminate catalyst with associated peaks in temperature progressing from the Rh-segment to the inlet face of the hexa-aluminate.

Figure 6A:
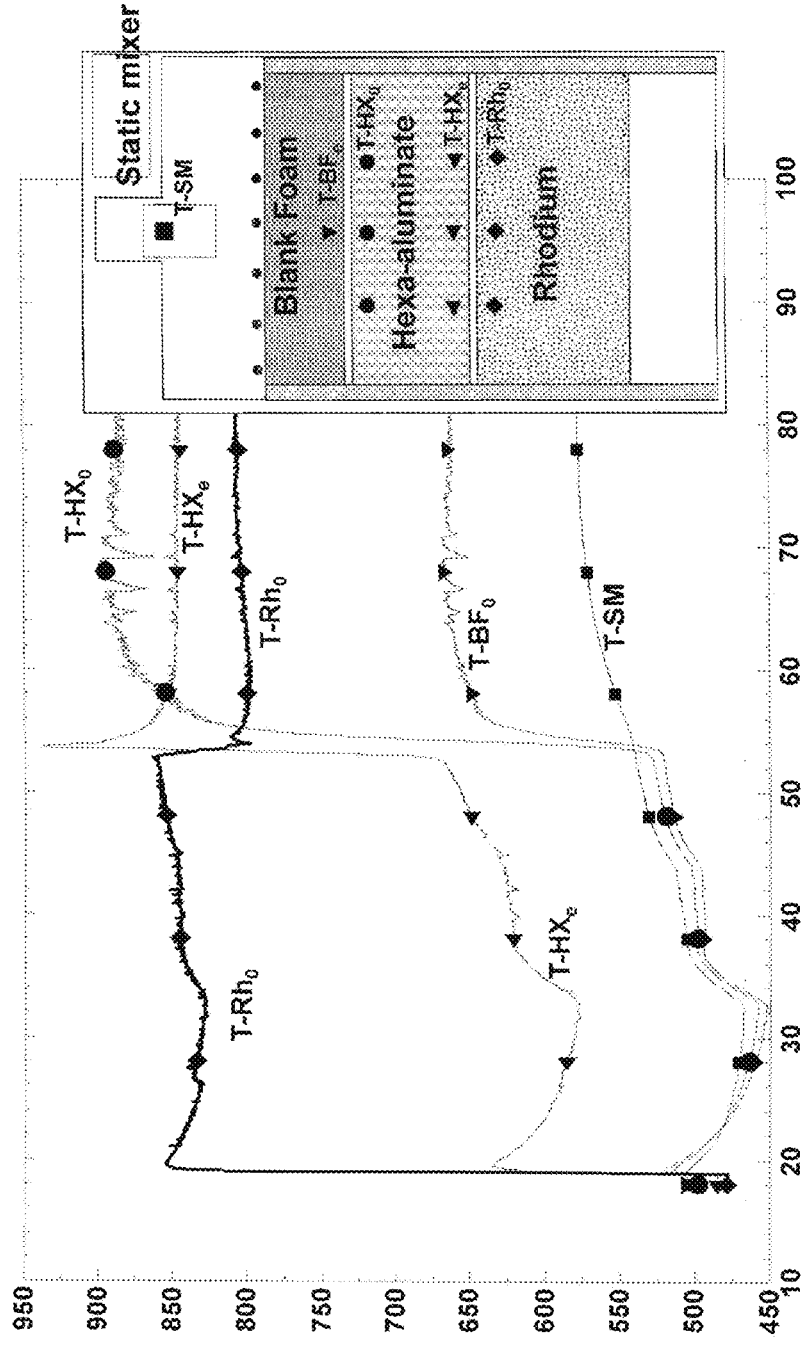
FIG. 6A is a graph of temperature profiles in the ATR, as a function of time, in accordance with features of the present invention.

FIG. 6A shows an example of the temperature profiles and product yields before and after ignition in the hexa-aluminate catalyst for 70% of rated flow (20 SLPM; SLPM=liters per minute at 25° C. and ambient pressure). The figure shows the temperatures at 5 axial locations. T-SM denotes the temperature at the exit (centered) of the static mixer, $T-BF_0$ the temperature at the exit (centered) face of the uncoated foam (blank foam). $T-HX_0$ and $T-HX_e$ denote the temperatures at the inlet and exit face of the hexa-aluminate. $T-Rh_0$ is the temperature measured at the inlet face of the first Rh-segment. The temperature in the catalyst sections were evaluated at three locations in the radial plane and plotted as an arithmetic average value. When the inlet feed temperature is low, the oxygen is primarily consumed up-stream the Rh-catalyst with an associated maximum in temperature (peak). As seen in FIG. 6A, at a time of ~50 min, the temperature at the front of the Rh is over 850° C. while the exit of the hexa-aluminate catalyst is about 650° C. The inlet temperature to the hexa-aluminate catalyst at that point is 525° C.

Figure 6B:
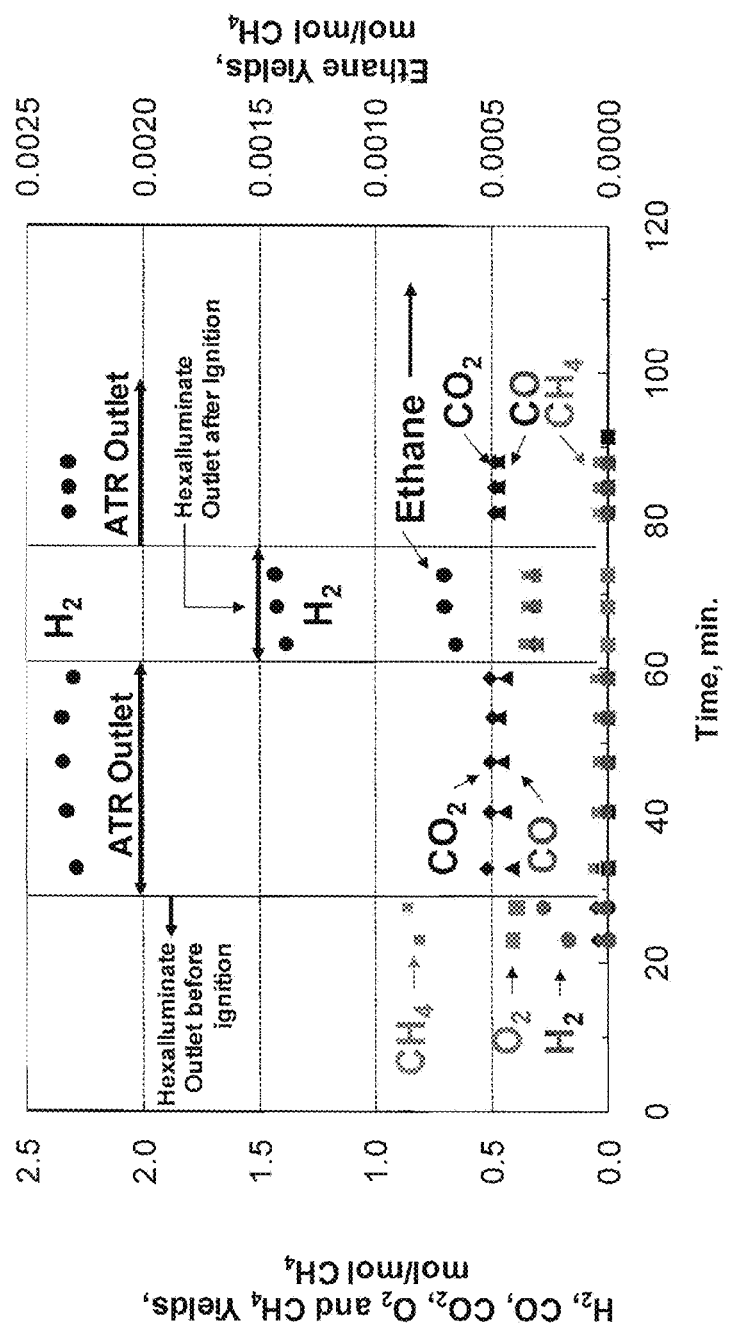
FIG. 6B is a chart showing product yields in various portions of the ATR, in accordance with features of the present invention.

As depicted in FIG. 6B, some oxygen, especially as the temperature increases, is consumed at the last stages of the hexa-aluminate volume. As seen in the measured product yield after the hexa-aluminate (20-30 minutes), there is a decrease in $O_2$ and $CH_4$ yields and 0.25 mol-$H_2$/mol-$CH_4$ is formed. This hydrogen production is the result of a conversion obtained within the hexa-aluminate, combined with some contribution of the inlet face of the Rh-catalyst. Some fuel conversion occurs at the last parts of the hexa-aluminate.

There is a substantial temperature increase at the exit of the hexa-aluminate due to back conduction from the Rh-catalyst. As temperature increases, kinetics starts to increase and slowly consume more fuel (and oxygen). The slope of the exit temperature of the hexa-aluminate catalyst is higher than the slope of the inlet temperature to this segment. Some heat release is occurring at the exit part due to some $O_2$ consumption. As temperature is increased further, more $O_2$ is consumed, more heat is released and the reaction self-accelerates to the point where the temperature spikes at the exit of the hexa-aluminate. Just after 55 min, most (if not all of oxygen) is consumed down-stream of the hexa-aluminate as the exit temperature increases rapidly and the temperature at the front of the Rh (T-Rh0) drops. The oxidation reaction progresses from the hexa-aluminate/Rhodium interfaces and at about 56 min, the oxygen consumption occurs at the inlet (front-face) of the hexa-aluminate catalyst. At that point, the peak temperature is located at the front of the hexa-aluminate, almost 900° C., and the temperature falls progressively downstream, with the gases finally entering the Rh-segment at 800° C.

At that point in time, all oxygen is consumed within the hexa-aluminate, as can be seen in FIG. 6B, between 60-75 min. A substantial amount of $H_2$ is also formed (1.4 mol/mol-$CH_4$) and 0.3 mol/mol-$CH_4$ of CO and $CO_2$. Furthermore, some trace amount of ethane can be seen after the hexa-aluminate, something that is not observed after the Rh catalyst.

At equilibrium conditions (corresponding to the feed proportions used in these tests), the predicted yields for $H_2$ and CO are ~1.85 and ~1.0 mol/(mole-$CH_4$), respectively. The experimental conversion of methane, as seen in the figure, is not complete after the hexa-aluminate segment, the methane conversion is about 70%. The reforming reaction (steam reforming) appears to be slower within the hexa-aluminate layer; however, the gas hourly space velocity (GHSV) in this segment is close to 100,000 h-1 while the GHSV of the Rh segments is 30,000 $h^{-1}$.

Analysis of the product yields after the ATR reactor (Rh catalyst) reveals that before the hexa-aluminate ignites, substantially all the fuel is consumed in the Rh catalyst. The product yields are shown in FIG. 6B in the time frame between 30 and 60 minutes. Once oxygen is entirely consumed within the hexa-aluminate catalyst, the yields after the ATR are shown in the time frame 75-90 minutes. The gas yields at the ATR outlet are essentially the same. The difference is that once oxygen is consumed in the hexa-aluminate catalyst the Rh catalyst converts the unconverted fuel by steam-reforming reaction at substantially lower temperatures (between about 750 and 800 C) than those temperatures present (at least 850) when oxygen was present in the Rh segment (30-60 min).

Fuel Flow Detail

The ignition characteristics of the hexa-aluminate are effected by the flow-rate (or superficial velocity) of the fuel through this upstream catalyst. A higher velocity through the catalyst decreases the residence time for the reaction to occur within the catalyst and also increases the cooling of the catalyst surface. Therefore, light-off temperatures increase as flow-rate increases. For this example, base case conditions for the light-off tests comprised an inlet feed of: O2/C=0.52 and S/C=1.65. At 100% rated power, the methane flow is 5.5 SLPM (total flow entering the catalyst is 28.19 SLPM).

As can be determined from FIG. 6A, when the inlet feed temperature is high enough, the temperature at the back end of the hexa-aluminate catalyst increases sharply. Once this happens, the oxygen consumption and, consequently temperature peak, progresses rapidly up-stream to the inlet part of the hexa-aluminate. Ignition, that is when oxidation reactions are sustained in the hexa-aluminate, is therefore defined as the condition when the peak temperature moves from the noble metal catalyst, upstream to the leading edge of the hexa-aluminate catalyst.

The inventors have determined that establishing low velocity within the upstream exothermic reaction facilitating catalyst (e.g., hexa-aluminate based catalysts) allows hot zones, which developed in those catalysts, to travel backwards through the catalyst, and toward the fuel inlet of the system. This heat transfer upstream is found to be faster than the convective cooling of the incoming reactants.

Low velocities are maintained by using a smaller length to diameter ratio or using a variable diameter reactor (e.g., conically shaped) such that the reactor section encircling the partial oxidation catalyst (e.g., hexa-aluminate) closest to the fuel inlet has a larger diameter than its downstream counterpart. In one embodiment of the invention, the current length to diameter ratio for the downstream portion of the device is 1:1.5 or about 0.67. Therefore, a length to diameter ratio of less than about 0.67 is suitable for the proximal end (i.e, the end adapted to receive unreacted fuel) of the device. Generally, in such an embodiment of the invention, the proximal end of the device defines a length to diameter ratio that is less than the length to diameter ratio defined downstream by the housing of the device which encircles the noble metal catalyst.

FIG. 6B reveals product yields during the above-described heating profiles. FIG. 6B comprises four panels. The first panel shows reactant/product mix for that portion of the system just downstream of the hexa-aluminate catalyst, and upstream from the noble metal catalyst. The second and fourth panel shows reactant and product mix which exists at that portion of the system which is directly downstream of the noble-metal catalyst.

The feed temperature at ignition point is correlated by the temperature measured at the front of the hexa-aluminate.

Figure 7:
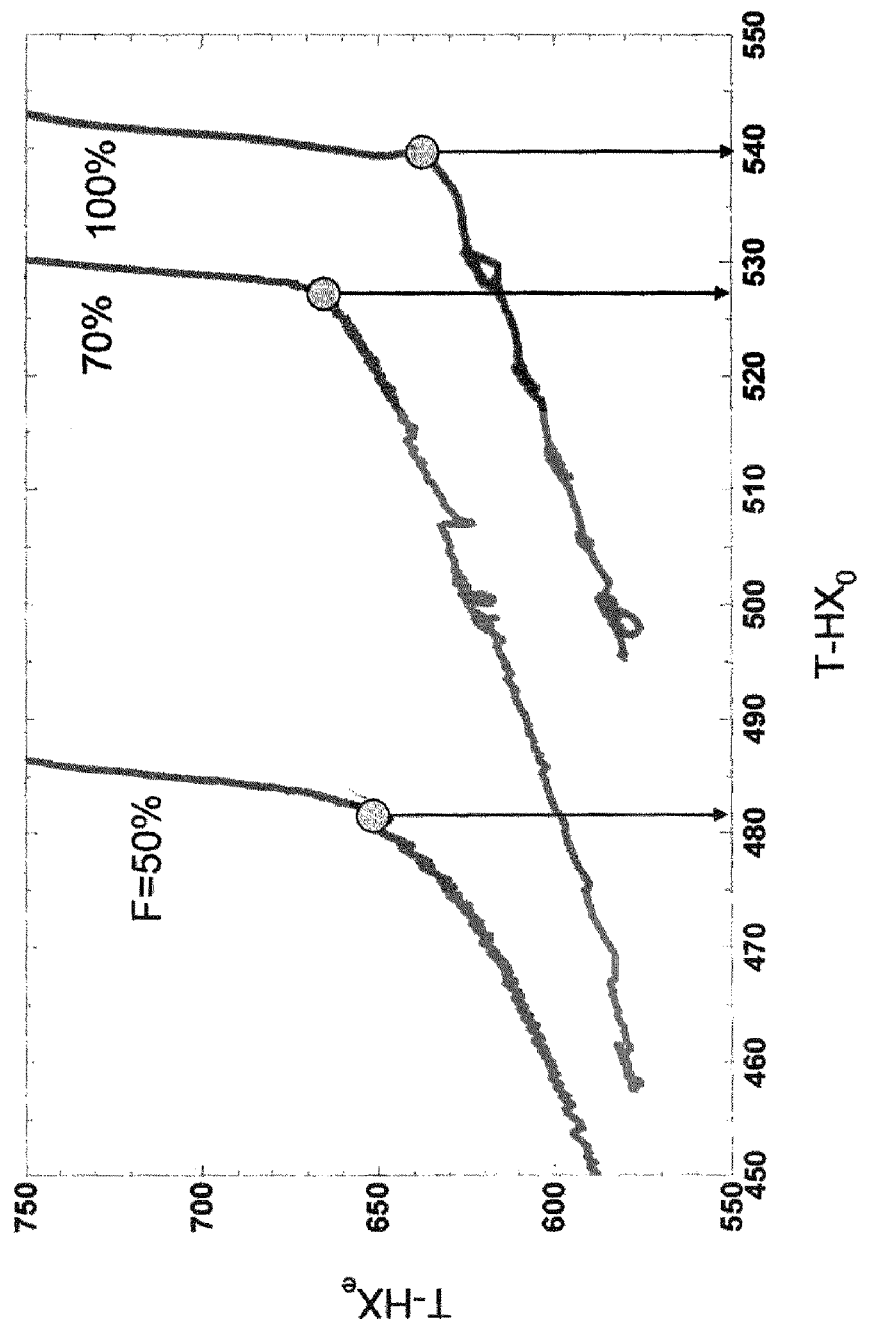
FIG. 7 is a graph showing light off temperatures as a function of fuel flow rates, in accordance with features of the present invention.

FIG. 7 shows the temperature at the exit section (T-HX$_e$) of the hexa-aluminate catalyst as function of its inlet counterpart (T-HX$_0$) for three different flow-rates. For each flow-rate, the inlet temperature (T-HX$_0$) is ramped up by turning on the heating coils located above the uncoated foam (see FIG. 1, element 18). The solid symbols denote the point of ignition, where the exit temperature (T-HX$_e$) sharply increases given a small increment of the inlet temperature (T-HX$_0$).

FIG. 7 clearly shows an increase in light off temperature with increasing fuel flow rates.

Ignition Point as Function
of Slope of T-Hx$_e$/T-Hx$_o$

Figure 8:
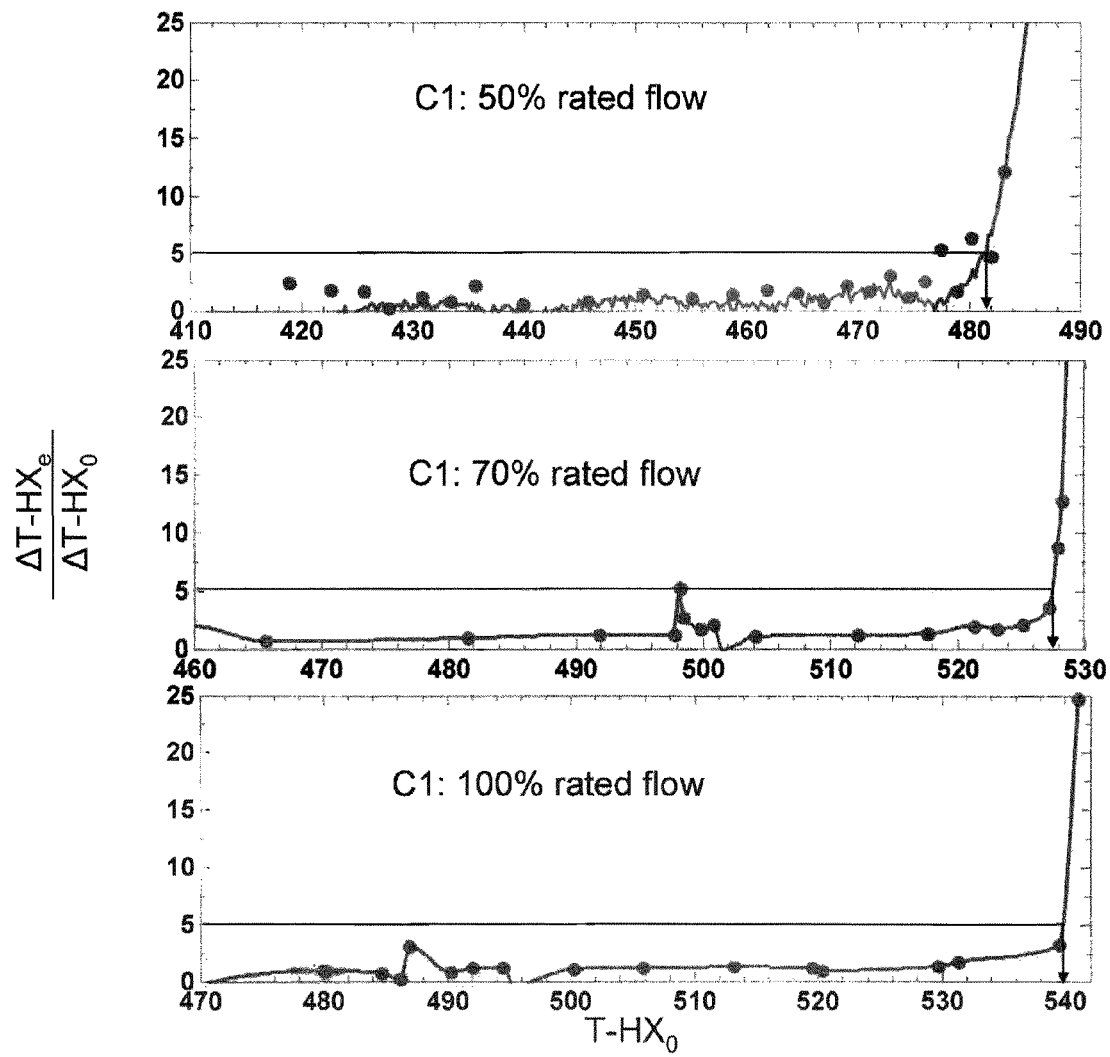
FIG. 8 is a series of graphs showing light off temperatures as a function of the slope of exit surface catalyst temperatures/inlet surface catalyst temperatures, in accordance with features of the present invention.

The ignition point is evaluated according to the derivative of the exit temperature and inlet temperature (dT-HX$_e$/dT-HX$_0$) as shown below In FIG. 8. At the point of ignition, the derivative changes drastically and significantly increases from being almost zero before ignition. To differentiate the light-off point from the experimental data scattering, the light-off point is defined as when the derivative exceeds a value of 5.

The base parameters which established this function are O$_2$/C of about 0.52 and a S/C of about 1.65.

As discussed supra, the higher the flow-rate (velocity) of the fuel stream, the higher the inlet feed temperature needs to be in order to sustain the oxidation reactions within the hexa-aluminate section. As flow increases, the residence time decreases for the oxidation reaction and more heat is transferred to the gas-phase removing heat from the catalyst surface. Another effect of the cooling mechanism is that less heat is transferred from the Rh-segment to the hexa-aluminate by back-conduction as the flow increases.

Figure 9:
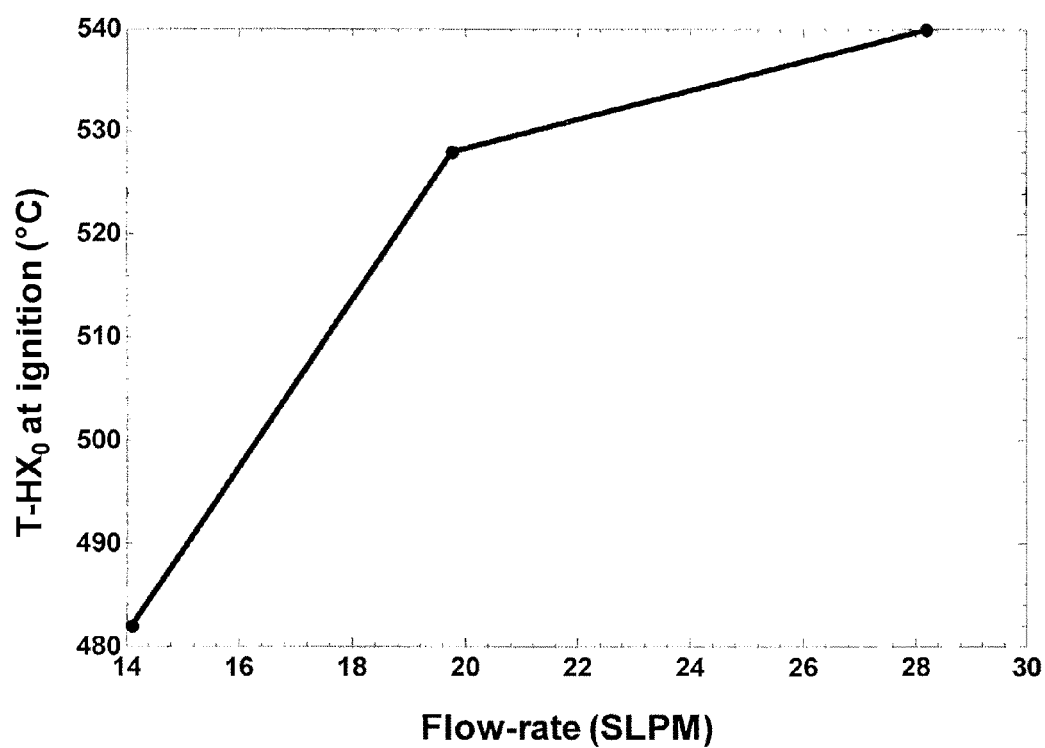
FIG. 9 depicts a plot of the inlet feed temperature to the hexa-aluminate at the point of ignition as function of flow rate, in accordance with features of the present invention.

FIG. 9 depicts a plot of the inlet feed temperature to the hexa-aluminate at the point of ignition as function of flow rate. As the inlet flow doubles, the inlet feed temperature for ignition is increased by 60° C. The base parameter of this plot is O2/C is equal to about 0.52, and S/C is equal to about 1.65.

Figure 10:
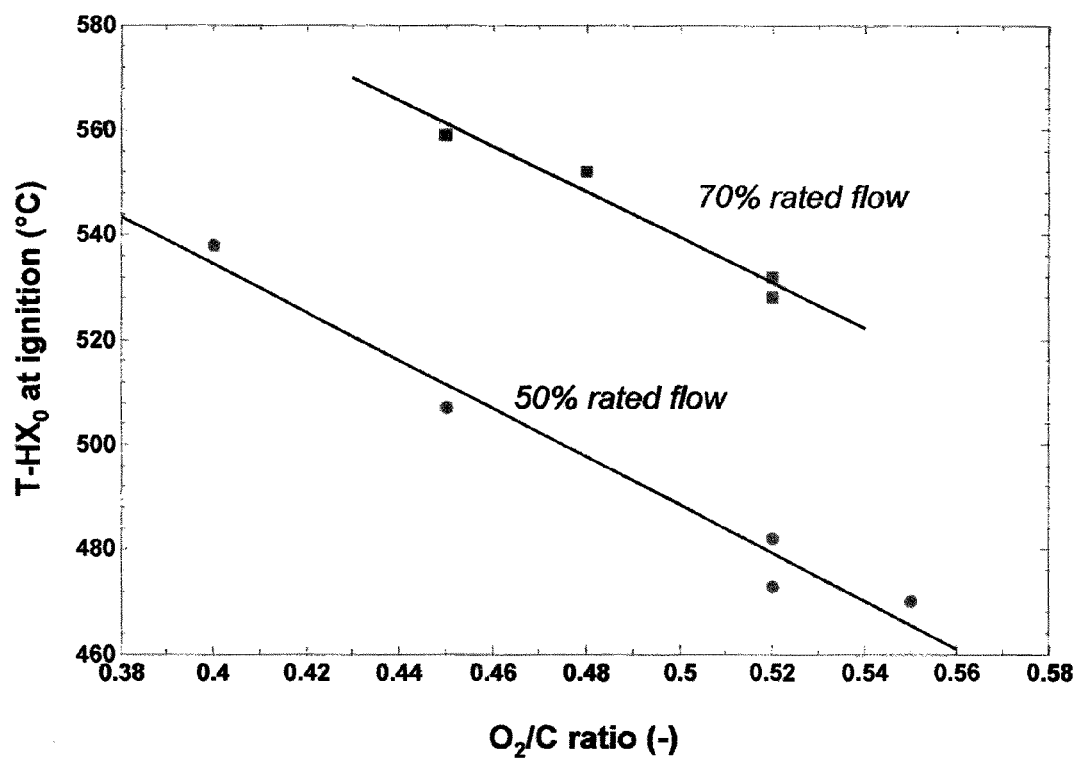
FIG. 10 is a graph showing the ignition temperature as a function of air to carbon ratio, in accordance with features of the present invention.

The inventors have found that the oxygen to carbon ratio also effects the ignition temperature. FIG. 10 shows how increasing the ratio decreased the light off temperature.

Keeping the total flow-rate constant, the O$_2$/C was varied to investigate the effect on ignition temperature. The S/C remained fixed at 1.65. FIG. 10 shows the effect of ignition temperature as function of O$_2$/C at 14 or 20 SLPM (50 percent and 70 percent rated flow). Increasing O$_2$/C decreases the inlet temperature needed to sustain oxidation reactions within the hexa-aluminate catalyst. At 50 percent rated flow, increasing the O$_2$/C from 0.4 to 0.55 decreases the inlet temperature by almost 80° C. for light-off. A similar behavior is observed at higher-flow rates, although the slope seems to decrease somewhat as flow-rate increases.

As the O$_2$/C ratio increased, the peak temperature on the Rh-catalyst increased when oxygen was consumed primarily within the Rh-catalyst. The peak temperature in that segment increased as the O$_2$/C ratio increased and vice versa. As the temperature in the Rh-increases, more heat is conducted back to the hexa-aluminate and less pre-heat is needed for the inlet reactants to ignite and sustain the oxidation reactions in the hexa-aluminate.

Figure 11:
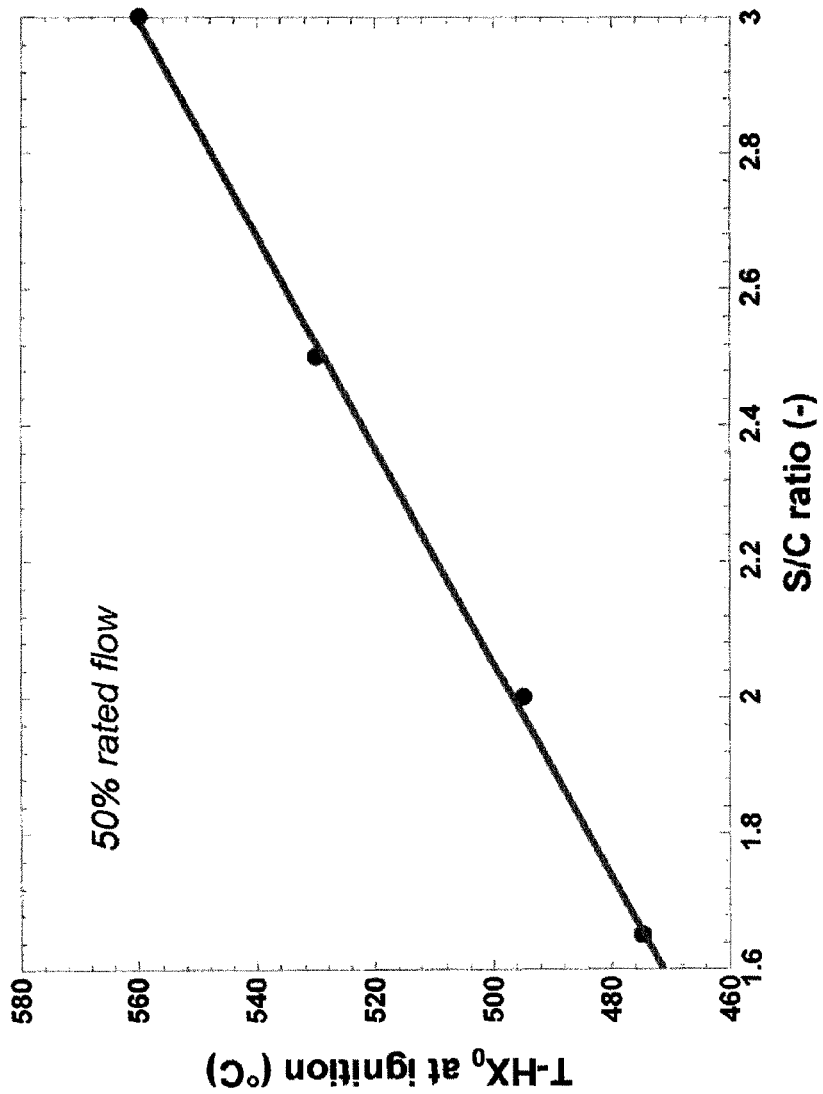
FIG. 11 is a graph showing the ignition temperature as a function of steam to carbon ratio, in accordance with features of the present invention.

FIG. 11 is a graph depicting the relationship between light off temperature of the system and the steam:carbon molar ratio.

The flow rate and oxygen-to-carbon ratio (O2/C) were kept constant at 14 SLPM (50 percent rated flow rate) and 0.52 respectively while varying the S/C ratio from 1.65 to 3. As shown in FIG. 11, the increased steam content increases the inlet temperature needed to sustain oxidation reactions within the hexa-aluminate catalyst. The inlet temperature increases by about 90° C. for light-off when the S/C ratio is changed from 1.65 to 3. This effect is to be expected, as higher steam content in the inlet feed mixture tends to reduce the temperature within the catalyst. This occurs from two factors a) an increased S/C ratio may increase the endothermic steam reforming reactions and b) increasing the S/C ratio reduces the concentration of fuel and air mixture thus diluting the reactants.

By the time the partially oxidized fluid contacts the Rh-Catalyst portion of the system, the temperatures have dissipated to approximately 800° C., and further decrease to approximately 700° C. with no detrimental effect to the efficiency of the reforming process. As such, in an embodiment of the invented system, completion of the reforming process by the downstream noble metal-containing catalyst occurs at as low as 700 C, and usually between 700 C and 850 C.

Table 1, below provides parameters determined empirically, to achieve minimum inlet temperatures of methane fuel feed to assure light off when hexa-aluminate oxidation catalyst and rhodium-based catalyst is utilized. The parameters include molar fractions of reactants, feed flow rates, and feed velocities. The catalyst structure used in these experiments was foam.

TABLE 1

Parameters for achieving targeted minimum inlet fuel temperatures.

| | | | | | | |
|---|---|---|---|---|---|---|
| O$_2$ molar fraction in Feed, % | 10.14 | 10.14 | 10.44 | 8.78 | 8.03 | 8.03 |
| CH$_4$ molar fraction in Feed, % | 19.51 | 19.51 | 18.98 | 21.96 | 15.44 | 15.44 |
| H$_2$O molar fraction in Feed, % | 32.2 | 32.2 | 31.3 | 36.2 | 46.3 | 25.4 |
| O$_2$/CH$_4$ in Feed | 0.52 | 0.52 | 0.55 | 0.40 | 0.52 | 0.52 |
| H$_2$O/CH$_4$ in Feed | 1.65 | 1.65 | 1.65 | 1.65 | 3.0 | 1.65 |
| Feed Flow Rate, SLPM | 28.2 | 14.1 | 14.1 | 14.1 | 14.1 | 14.1 |
| Superficial Velocity, cm/s (at 25° C.) | 41.2 | 20.6 | 20.6 | 20.6 | 20.6 | 20.6 |
| Min. Temperature, ° C. | 540 | 480 | 470 | 539 | 560 | 530 |

Generally, oxygen molar fractions in the feed can vary from 7 to 12 percent. Fuel molar fractions, such as methane, can vary from 14 to 20 percent. Water molar fractions can vary from 24 to 50 percent. Oxygen to fuel feed ratios can vary from 0.35 to 0.60. Water to fuel ratios can vary from 1.5 to 3.5 Feed Flow Rates (in SLPM) can vary from 13 to 43 cm/s.

Aside from the aforementioned operating ranges and additional, specific parameters empirically determined, can be found at Adachi et al., *Journal of Power Sources* 188 (2009) 244-255, the entirety of which is incorporated herein by reference.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The embodiment of the invention in which an exclusive property or privilege is claimed is defined as follows:

1. A fuel processor comprising:
   a. a structure adapted to have fluid pass through substantially its entire length, the structure having an upstream portion and a downstream portion and wherein the upstream portion has a larger diameter than the downstream portion;
   b. a first catalyst supported at the upstream portion;
   c. a second catalyst supported at the downstream portion, wherein the first catalyst is in fluid communication with the second catalyst, and
   d. uncoated foam positioned upstream from the first catalyst such that the first catalyst resides between the foam and the second catalyst.

2. The fuel processor as recited in claim 1 further comprising a fuel inlet in thermal communication with said upstream portion.

3. The fuel processor as recited in claim 1 wherein said first catalyst operates at a higher temperature than the second catalyst.

4. The fuel processor as recited in claim 1 wherein said first catalyst is an oxidation catalyst and said second catalyst is a reforming catalyst.

5. The fuel processor as recited in claim 1 wherein the first catalyst and the second catalyst are supported on one contiguous substrate.

6. The fuel processor as recited in claim 5 wherein the contiguous substrate is a metallic foam defining channels extending throughout the substrate so as to facilitate fluid exchange from an exterior of the substrate to an interior of the substrate.

7. The fuel processor as recited in claim 5 wherein the substrate defines channels which extend from an upstream end of the substrate to a downstream end of the substrate.

8. The fuel processor as recited in claim 1 wherein an ignition source ignites the fuel at an upstream portion of the substrate.

9. The fuel processor as recited in claim 1 wherein the upstream portion is an oxidation catalyst selected from the group consisting of hexaluminates, spinels, perovskites, and garnets.

* * * * *